United States Patent Office 3,262,754
Patented July 26, 1966

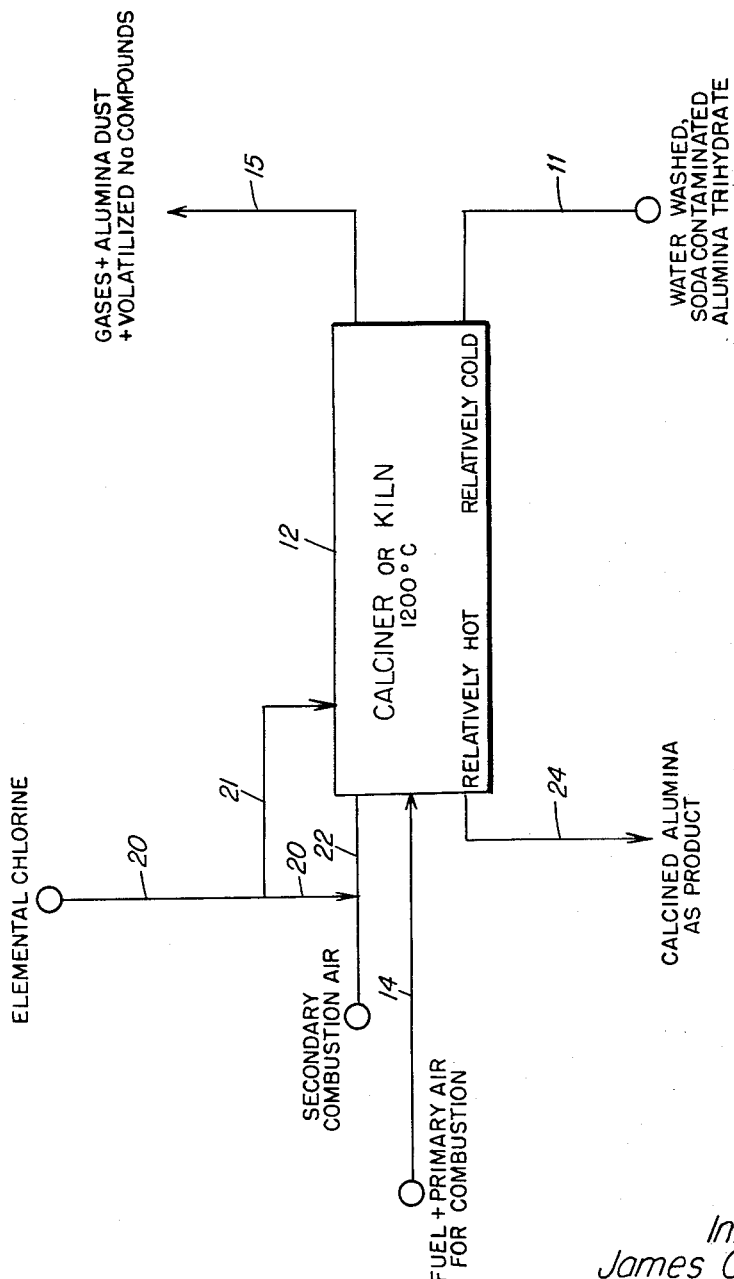

3,262,754
METHOD OF MAKING LOW SODA ALUMINA OF SMALL CRYSTAL SIZE
James Gordon Lindsay and Hugh Joseph Gailey, Arvida, Quebec, Canada, assignors to Aluminium Laboratories Limited, Montreal, Quebec, Canada, a corporation of Canada
Filed Dec. 7, 1964, Ser. No. 416,501
3 Claims. (Cl. 23—142)

This is a continuation-in-part of our copending application Serial No. 114,947, filed June 5, 1961, now Patent No. 3,175,883.

This invention relates to alumina, anhydrous and/or hydrated alumina. More particularly, this invention relates to the treatment of alumina for the production of high purity industrial alumina having improved physical properties. Still more particularly, this invention relates to the treatment of soda (measured as $Na_2O$) contaminated alumina for the preparation of substantially soda-free alumina or alumina having substantially reduced soda contamination. Also, this invention relates to the treatment of alumina for the preparation of alumina having improved physical properties, particularly with respect to the crystalline structure thereof. Still more particularly, this invention relates to the preparation of calcined alumina having improved physical properties and useful in the fabrication of electrical insulators, such as electrical insulating bodies useful in the manufacture of spark plugs and the like. Further, this invention relates to the preparation of alpha-alumina or corundum having improved purity and physical properties.

Alumina, particularly calcined alumina, is useful in the manufacture of electrical insulators. For such use it is desirable that the alumina be substantially free of sodium contamination, usually referred to as soda ($Na_2O$) contamination, since soda contamination adversely affects the electrical properties of alumina. In general, the lower the sodium content or soda contamination of alumina the better suited the alumina is for such uses as electrical insulators and the like, provided that the alumina is of such a physical nature so as to produce a ceramic body whose characteristics or physical properties such as firing shrinkage, modules of rupture, resistance to thermal shock, etc., are also satisfactory or acceptable.

In commerce alumina is for the most part manufactured from aluminous material, i.e. aluminum containing material such as bauxite. One well-known process for the manufacture of alumina is the Bayer process and the practice of this invention is particularly useful in the treatment of alumina produced by means of the Bayer process. In the Bayer process aluminous material, such as bauxite, after suitable heat treatment for the removal of organic materials, is digested with aqueous caustic solution to produce an aqueous sodium aluminate solution. The resulting aqueous sodium aluminate solution is then treated to precipitate alumina therefrom, usually in the form of alumina trihydrate. The precipitated alumina trihydrate, after suitable washing, is recovered as alumina product or may be heat treated or calcined, to produce anhydrous alumina or alumina of a desired lower degree of hydration.

In the commercial production of alumina, such as by the above-described Bayer process, the alumina contains certain impurities, particularly sodium contamination or soda contamination.

Accordingly, it is an object of this invention to provide an improved process for the production of alumina having a reduced soda contamination.

It is another object of this invention to provide a process for the treatment of alumina wherein there is produced alumina having improved physical properties and other characteristics.

Another object of this invention is to provide a substantially continuous process for the treatment of alumina, either anhydrous alumina or hydrated alumina or mixtures thereof, to produce a calcined alumina product having a reduced soda contamination and improved crystal structure and other physical characteristics.

Still another object of this invention is to provide a process for the treatment of alumina produced by means of the Bayer process wherein the resulting produced and treated alumina recovered as product has a substantially reduced soda content, particularly as compared with the soda content of alumina as produced directly from the Bayer process without any subsequent treatment.

Yet another object of this invention is to provide calcined alumina useful in the manufacture of electrical insulators, spark plugs and the like.

In our copending application Serial No. 114,947 there is disclosed and claimed a process for making low soda alumina having a crystal size of about 5–12 microns. This is accomplished by calcination in the presence of chlorine and a fluorine compound. Under these calcination conditions chlorine alone produces crystal sizes of about 1–3 microns. Low soda aluminas of this crystal size are now useful for the production of dense ceramics consisting of essentially 100% alumina at firing temperatures obtainable in commercial kilns; these possess greater strength, abrasion resistance and improved electrical properties than the conventional 80–95% alumina ceramics.

A further object of this invention is to provide a reactive low soda, essentially alpha, alumina of about 1–3 micron crystal size, especially 1–2 micron size.

How these and other objects of this invention are achieved will become apparent in the light of the accompanying disclosure and drawing where there is schematically illustrated a process flow in accordance with one embodiment of the practice of this invention. In at least one embodiment of the practice of this invention at least one of the foregoing objects will be achieved.

It has now been discovered that alumina having improved properties is obtained by calcining soda-contaminated, particle-form alumina in the presence of a chlorine-containing material, preferably, gaseous elemental chlorine. More particularly, it has been discovered that sodium-contaminated alumina, usually referred to as soda-contaminated alumina, can be treated to yield an alumina product having a reduced sodium contamination or a reduced soda content and improved physical properties, particularly as to crystalline structure, by calcining alumina at an elevated temperature, such as a temperature in the range 1000–1400° C., preferably at a temperature of at least 1200° C., in the presence of a chlorine-containing material such as elemental chlorine. It has been found that when soda-contaminated alumina is treated in accordance with the practices of this invention, such as alumina having a soda contamination of about 0.65% by weight based on alumina, as $Al_2O_3$, more or less, the soda contamination is substantially reduced.

In the treatment of soda-contaminated alumina in accordance with this invention, alumina, anhydrous, partially hydrated or fully hydrated or mixtures thereof, satisfactorily respond to treatment and evidence improvement in physical properties, crystalline structure and soda content. Alumina as produced via the Bayer process is particularly susceptible to treatment in accordance with this invention.

In the calcining operation wherein the alumina is heat treated in the presence of the special treating agent of this invention, conventional calcining temperatures are employed. Preferably, however, the calcining operation is carried out at a temperature of at least 1200° C. Any suitable means for effecting calcining or high temperature heat treatment in the presence of the treating agent, e.g., chlorine may be employed. Particularly suitable for carrying out the heat treatment or calcining operation is a direct fired rotary kiln wherein air admixed with a suitable fuel such as oil or gas or pulverized solid fuel such as coal or coke, or mixtures thereof, is supplied at one end, usually referred to as the hot end of the kiln and particle-form alumina either in the dry or moist state or in an aqueous slurry is supplied to the other or cold end of a kiln. The hot combustion gases from the hot end of the kiln pass in direct counter-current contact with the particle-form alumina. The resulting calcined alumina is recovered as product at about the hot end of the kiln and combustion gases together with any alumina dust particles and volatilized contaminants, e.g. volatilized sodium compounds derived from the soda contaminants in the feed alumina, are withdrawn at the other end or cold end of the kiln.

Although it is preferred to carry out the heat treatment or calcining operation in a direct fired rotary kiln any other means suitable for effecting high temperature heat treatment of particle-form alumina in direct contact with the treating agent may be employed. Other suitable means for effecting high temperature contact would include a vessel containing a fluidized mass of alumina particles, the mass of alumina particles being fluidized by an upwardly flowing stream of hot combustion gases containing the treating agent of this invention entrained and/or volatilized therein, together with means for continuously introducing fresh, particle-form alumina and withdrawing treated alumina particles.

In the calcining or heat treatment operation of this this invention higher calcining temperatures improve the removal of soda contaminants from the alumina undergoing treatment. Accordingly, it is preferred to effect the heat treatment at a temperature as high as practical, preferably above about 1200° C. but below the incipient fusion or melting point of the alumina particles. Further, it is desirable that the alumina particles undergoing treatment be subjected to calcining and in contact with the treating agent of this invention for a period of time at least sufficient to reduce the soda contamination of the alumina substantially below that of the feed alumina, such as a period of time sufficient to reduce the soda contamination by about 30% or one-third, preferably by about 75%. For example, in the practice of this invention it is preferred that the alumina undergoing heat treatment be calcined in the presence of the treating agent for a period of time at least sufficient to reduce the soda contamination or soda content in the treated alumina to at least below about 0.15% by weight based on the treated alumina, $Al_2O_3$ and desirably below about 0.10%. Usually, a calcining time of at least about 15 minutes, more or less, yields a satisfactory treated alumina product. Accordingly, a calcining time in the range 0.3–3.5 hours, or more, would yield a satisfactory calcined alumina product. It is pointed out that the longer the calcining time the lower the soda content or soda contamination in the treated alumina and the greater the crystal development or growth in the resulting calcined alumina.

The chlorine containing material used in the process may be any material (compound) which provides reactive chlorine either as such, i.e., gaseous elemental chlorine itself, or as a product of a decomposition of a chloro-compound within the calcining zone. Gaseous elemental chlorine is the preferred material. Illustrative chlorine-containing materials are: chlorine ($Cl_2$); ammonium chloride; hydrogen chloride; aluminum trichloride and phosgene.

In the use of the chlorine-containing treating agent it has been observed that by itself the chlorine-containing treating agent is effective for the removal of the soda contaminant from the alumina but that this effect is particularly noticeable at relatively high concentrations of the chlorine-containing treating agent, such as at a concentration in the treating zone of above 1.5% by weight based on alumina. It has also been observed that the chlorine agent is effective as a mineralizing agent for the promotion of crystalline alpha alumina having a small crystal size, such as an average crystal size in the range 1–3 microns, more or less.

The rate of growth with chlorine is much slower than with fluorides. In the case of fluoride the growth is very fast at first, so that 4–5 micron crystals are obtained right away. In the case of chlorine, the growth rate is much slower and the alpha alumina may be removed from the kiln while the crystals are still very small.

In the heat treatment operation only a minor amount of the chlorine-containing material is employed. Generally an amount of chlorine-containing material, such as elemental chlorine, in the range of 0.5–10% chlorine or chlorine content based on the weight of the product calcined alumina, is sufficient to yield satisfactory results, i.e. the production of a calcined alumina product having a substantially reduced soda contamination.

Referring now to the accompanying drawing which schematically illustrates a process flow in accordance with this invention, soda-contaminated alumina, such as soda-contaminated alumina trihydrate as may be produced as a product of the Bayer process for the manufacture of alumina from bauxite and having a soda contamination content of about 0.65% by weight soda, is supplied, after water-washing, from a suitable source, not shown, via line 11 to one end, such as the relatively cold end, of a direct fired rotary kiln or calciner 12.

Kiln or calciner 12 is heated or fired by supplying to the other end or hot end thereof via line 14 a combustible admixture comprising a suitable fuel, such as fuel oil, and air. During firing the hot combustion gases flow from the relatively hot end of calciner 12 to the relatively cold end thereof and are recovered therefrom via line 15. The combustion gases recovered from the relatively cold end of calciner 12 via line 15 may then be treated for the recovery of values therefrom, such as precipitation or filtration of alumina dust by suitable means and the resulting substantially dust-free gases passed to a waste heat boiler for the recovery of heat values.

Chlorine-containing treating agent, here gaseous chlorine, is introduced into the relatively hot end of calciner 12 via lines 20 and 21. Preferably, chlorine is introduced into calciner 12 in admixture with the secondary combustion air supplied to calciner 12 via line 22. Although in the drawing the secondary combustion air is shown supplied to calciner 12 via line 22 in actual practice the secondary combustion air is the air which enters or leaks into the calciner at the exit end thereof from the calcined alumina.

During the calcining operation a temperature of at least about 1200° C. is maintained within calciner 12, at least at about the relatively hot end thereof as the feed alumina hydrate is advanced or moved from the relatively cold end of calciner 12 to the relatively hot end thereof. As the alumina moves along within calciner 12 from the cold end to the hot end thereof it is subjected to a calcining temperature, at least about 1200° C. in the presence of and in contact with the gaseous chlorine. As a result of this high temperature contact between the alumina and the gaseous chlorine the soda contamination in the alumina is reduced, the chlorine pyrohydrolysis products therefrom reacting with the soda contaminants in the alumina to form volatilizable sodium compounds which are volatilized during the calcining operation. These volatilizable sodium compounds are swept along with the hot combustion gases flowing within calciner 12 from the hot end to the cold end thereof and are withdrawn from calciner 12 via line 15.

As indicated the gases withdrawn from calciner 12 via line 15 contain entrained therein alumina dust particles and the volatilized sodium compounds due to the removal of the sodium contaminants from the alumina undergoing treatment. Desirably, the entrained alumina dust is recovered from the gases removed via line 15 and, if desired, the thus-separated and recovered alumina dust is passed to another kiln for conventional calcining or another calcining operation in accordance with this invention. If desired, the alumina dust withdrawn from calciner 12 via line 15 is separated and recovered and after water washing can be reintroduced into calciner 12 in admixture with the alumina trihydrate material supplied to calciner 12 via line 11 or introduced into calciner 12 at any other suitable location. There is withdrawn from the relatively hot end of calciner 12 via line 24 resulting calcined treated alumina now having a substantially reduced soda contamination, e.g. below about 0.1% by weight soda and an improved crystal size, the monocrystals having an average crystal size in the range 1-2 microns.

The following tests are illustrative of the practices of this invention.

TESTS

According to the teachings of our Serial No. 114,947 alumina trihydrate having a sodium contamination of about 0.65% by weight soda, based on alumina ($Al_2O_3$) was calcined at a temperature of at least about 1200° C. in the presence of minor amounts of chlorine and aluminum fluoride. The resulting calcined alumina was then recovered, percent soda contamination of the resulting treated alumina was determined and the average crystal size was also determined.

Table I

| Test No. | Percent $Cl_2$ | Percent $AlF_3$ | Average Crystal Size (microns) | Percent $Na_2O$ (Based on $Al_2O_5$) |
|---|---|---|---|---|
| | (Based on $Al_2O_3$) | | | |
| 1 | 0.5 | 0.4 | 5-6 | 0.44 |
| 2 | 1.0 | 0.4 | 6 | 0.36 |
| 3 | 2.0 | 0.4 | 7 | 0.23 |
| 4 | 0.5 | 1.5 | 10 | 0.33 |
| 5 | 1.0 | 1.5 | 12 | 0.28 |
| 6 | 2.0 | 1.5 | 12 | 0.22 |

The foregoing test indicates how by means of the combination of treating agents, the chlorine-containing treating agent, e.g. elemental chlorine and the fluorine-containing treating agent, e.g. aluminum fluoride, there is produced from soda contaminated alumina material, such as soda contaminated alumina trihydrate, a calcined crystalline alumina comprising substantially 100% alpha-alumina having a greatly reduced soda contamination and comprised of substantially large monocrystals, monocrystals having an average crystal size in the range 5-12 microns.

EXAMPLES

Illustrative of the advantages obtained in accordance with the practices of this invention, alumina material having a soda contamination of about 0.65% by weight soda was calcined at a temperature of 1300° C. in the absence of and in the presence of varying amounts of gaseous chlorine. The results of these tests are set forth in accompanying Table II.

Table II

| Ex. No. | Percent Chlorine (Based on $Al_2O_3$) | Percent Alpha Alumina | Average Crystal Size (microns) | Percent $Na_2O$ (Based on $Al_2O_3$) |
|---|---|---|---|---|
| 7 | 0 | 0 | | 0.59 |
| 8 | 1.1 | 75 | 1 | 0.16 |
| 9 | 1.7 | 100 | 2 | 0.03 |
| 10 | 3.2 | 100 | 2 | 0.03 |

The data set forth in accompanying Table II show that chlorine is effective as the sole agent during calcining for reducing soda contamination in the alumina material undergoing treatment. More particularly, the test data set forth in Table II clearly indicate that when chlorine alone was employed in a calcining operation the resulting crystalline calcined alumina comprised fine, small monocrystals having an average crystal size in the range 1-2 microns.

As will be apparent to those skilled in the art in the light of the foregoing disclosure many modifications, alterations and substitutions are possible in the practice of this invention without departing from the spirit or scope thereof.

Thus having described the invention, what is claimed is:

1. A method of producing low soda content alumina, of substantially all alpha alumina content and having an average crystal size in the range of about 1-3 microns, which method comprises:
   (a) calcining soda-contaminated alumina particles derived from the Bayer Process at an elevated temperature from about 1200° C. up to the melting point of alumina, in the presence of chlorine gas, as the sole reagent, in an amount of about 0.5-10% sufficient to obtain the desired soda removal during the calcination, for a time of about 0.3-3.5 hours to obtain alumina of substantially all alpha alumina content and of the desired crystal size; and
   (b) withdrawing from said calcining zone an alumina of substantially all alpha alumina content, of an average crystal size in the range of about 1-3 microns, and a soda content substantially less than that of the soda contaminated alumina feed to said calcination.

2. The method of claim 1 wherein said chlorine usage is in the range of about 1.5-10%, based on the weight of calcined alumina.

3. A method of producing reactive alumina which method consisting of:
   (a) calcining at a temperature of about 1300° C., alumina particles derived from the Bayer Process having a soda content of about 0.65%, in the presence of gaseous elemental chlorine, in an amount of about 1.7-3.2% based on calcined alumina, for a time of about 0.3-3.5 hours to remove soda to the desired level and obtain substantially all alpha alumina; and
   (b) withdrawing from said calcining zone alpha alumina particles having an average crystal size of about 2 microns and a soda content of about 0.03%.

References Cited by the Examiner

UNITED STATES PATENTS

| 1,785,464 | 12/1930 | Suzuki et al. | 23—142 |
| 2,411,806 | 11/1946 | Riesmeyer et al. | 23—143 |
| 2,411,807 | 11/1946 | Riesmeyer et al. | 23—143 |

FOREIGN PATENTS

| 864,009 | 3/1961 | Great Britain. |
| 578,949 | 7/1958 | Italy. |

OTHER REFERENCES

Edwards, et al.: "Aluminum and Its Production," vol. 1, McGraw-Hill Book Co., Inc., New York, 1930, flysheet and pages 124–125, 138–139.

OSCAR R. VERTIZ, Primary Examiner.

MAURICE A. BRINDISI, Examiner.

H. T. CARTER, Assistant Examiner.